(12) United States Patent
Martin et al.

(10) Patent No.: US 10,246,256 B1
(45) Date of Patent: Apr. 2, 2019

(54) PARALLEL AXIS, ROTARY CONVEYANCE MECHANISM

(71) Applicant: Amazon Technologies, Inc., Seattle, WA (US)

(72) Inventors: Timothy Patrick Martin, Medford, MA (US); Yvetta Pols Sandhu, Winchester, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/819,449

(22) Filed: Nov. 21, 2017

(51) Int. Cl.
 *B65G 1/127* (2006.01)
 *B65G 1/04* (2006.01)
 *B62B 3/10* (2006.01)
 *B62B 5/00* (2006.01)

(52) U.S. Cl.
 CPC ............... *B65G 1/127* (2013.01); *B62B 3/10* (2013.01); *B65G 1/0492* (2013.01); *B62B 5/0033* (2013.01)

(58) Field of Classification Search
 CPC ......... B65G 35/063; B65G 1/127; B25H 3/00
 See application file for complete search history.

(56) References Cited

U.S. PATENT DOCUMENTS

| | | | | |
|---|---|---|---|---|
| 5,370,247 A | * | 12/1994 | Handleman | B25H 3/00 211/164 |
| 6,155,750 A | * | 12/2000 | Wu | E02D 17/08 405/272 |
| 6,557,491 B1 | * | 5/2003 | Weiser | A01G 9/022 119/57.8 |
| 9,962,992 B1 | * | 5/2018 | Covey | B60B 1/06 |
| 2004/0079620 A1 | * | 4/2004 | Aleshire | A47B 49/00 198/711 |
| 2005/0061622 A1 | * | 3/2005 | Martin | B65G 1/127 198/469.1 |
| 2008/0298943 A1 | * | 12/2008 | Siegel | B65G 1/127 414/567 |
| 2012/0148348 A1 | * | 6/2012 | Stockstill | B23K 37/047 405/170 |
| 2015/0352454 A1 | * | 12/2015 | Barse | A63H 17/262 446/465 |
| 2018/0281835 A1 | * | 10/2018 | Finas | B62B 1/18 |

\* cited by examiner

*Primary Examiner* — Thomas Randazzo
(74) *Attorney, Agent, or Firm* — Baker & Hostetler LLP

(57) ABSTRACT

A rotary conveyance mechanism includes a pair of spaced apart, offset wheels and interconnecting carriages that are configured to maintain a horizontal position when the wheels are rotated. A tote presentation and management system can employ the rotary conveyance mechanism.

20 Claims, 5 Drawing Sheets

PARALLEL AXIS, ROTARY CONVEYANCE MECHANISM

BACKGROUND

The present invention relates to conveyors and more particularly to rotary conveyors for totes.

Several types of conveyors operate in a loop in a way that conveys the objects while maintaining the conveying surface in a horizontal or upright orientation. For example, several types of vertical carousels operate on a belt or chain that maintain the horizontal orientation of the shelves. In a typical vertical carousel installation, a control system positions the desired shelf at its desired position for accessing by a person or robot.

In other environments, objects are conveyed on horizontal conveyors in open-topped containers, one type of which is referred to as a tote. For example, a person or robot can pick one or more items from a shelf or pod and place the item in a tote for further transport and processing. The system typically is controlled by scanning a code on the item such that a code on the tote that corresponds to the code on the item. The tote containing the item is then pushed onto a conveyor for additional processing.

DETAILED DESCRIPTION OF ILLUSTRATIVE EMBODIMENTS

Figure 1:
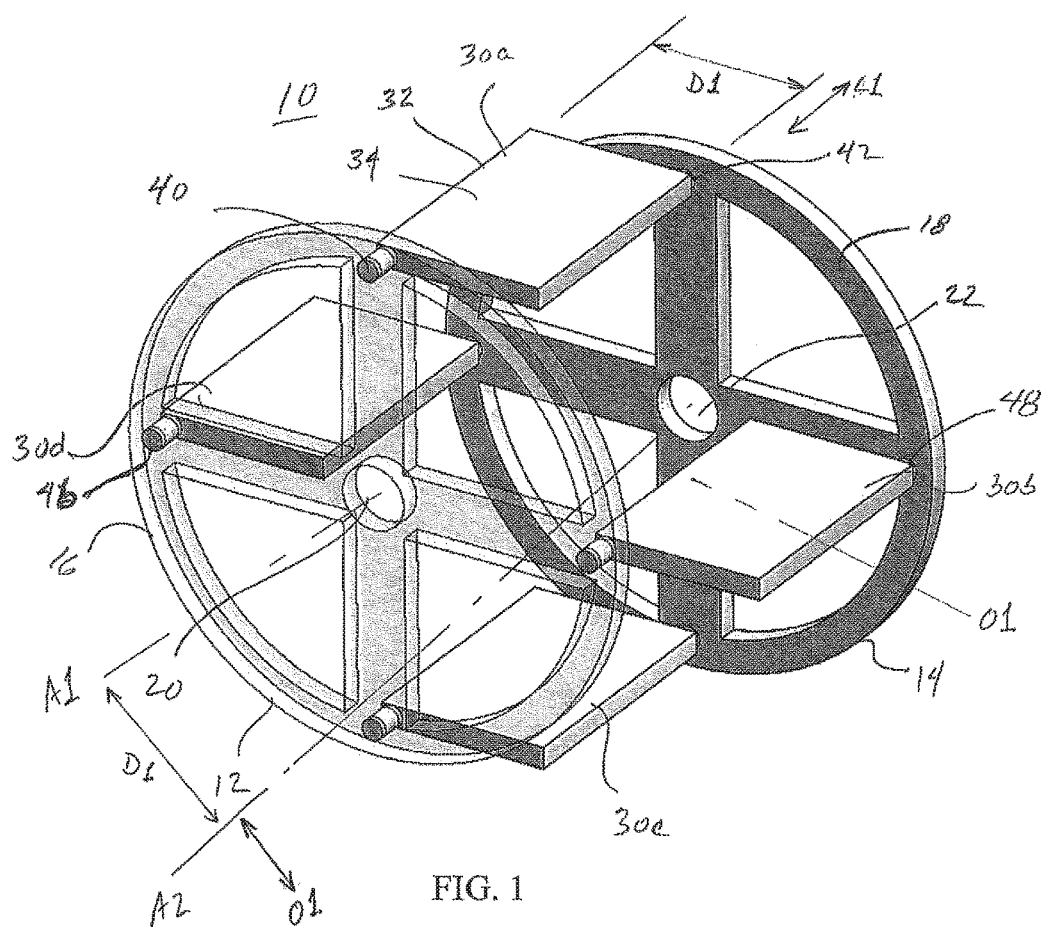
FIG. 1 is a perspective, schematic view of a parallel axis, rotary conveyance mechanism, with some part shown transparent for clarity, and the carriages of the mechanism shown at the 12, 3, 6, and 9 o'clock positions.
Figure 2:
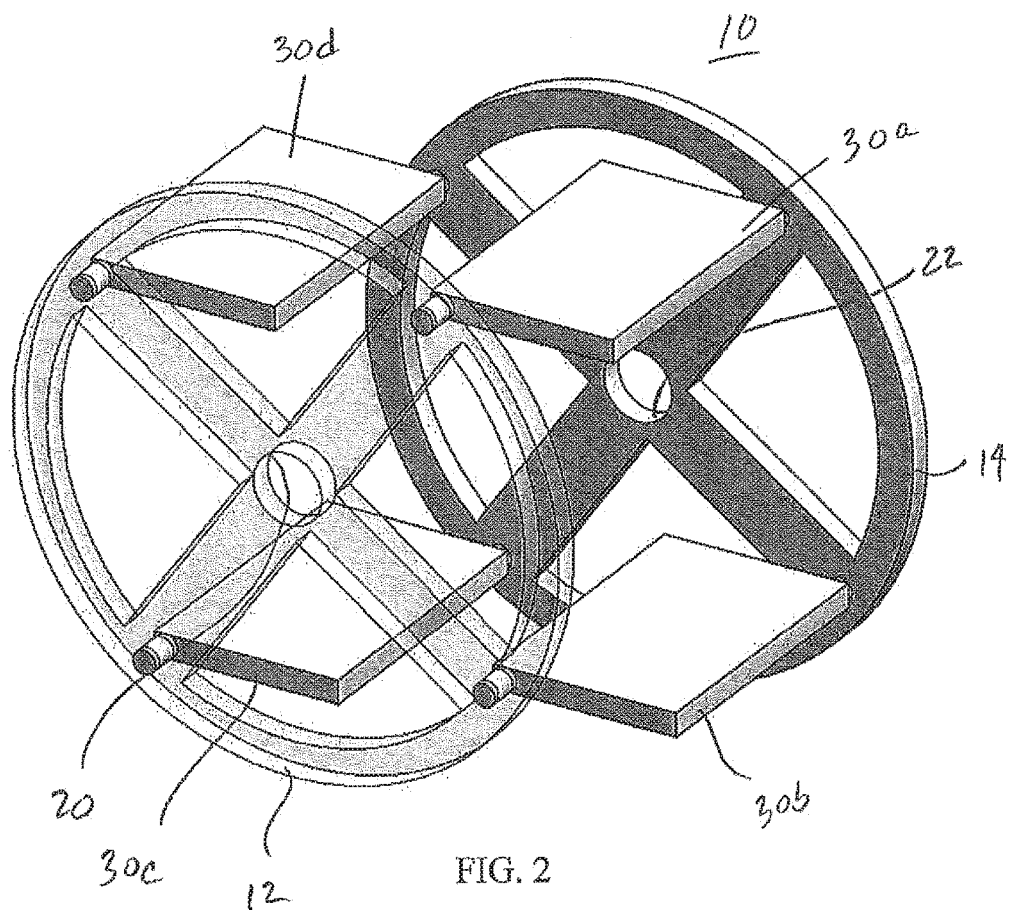
FIG. 2 is a perspective view of the mechanism of FIG. 1 with the wheels rotated approximately 45 degrees from the position shown in FIG. 1.
Figure 3:
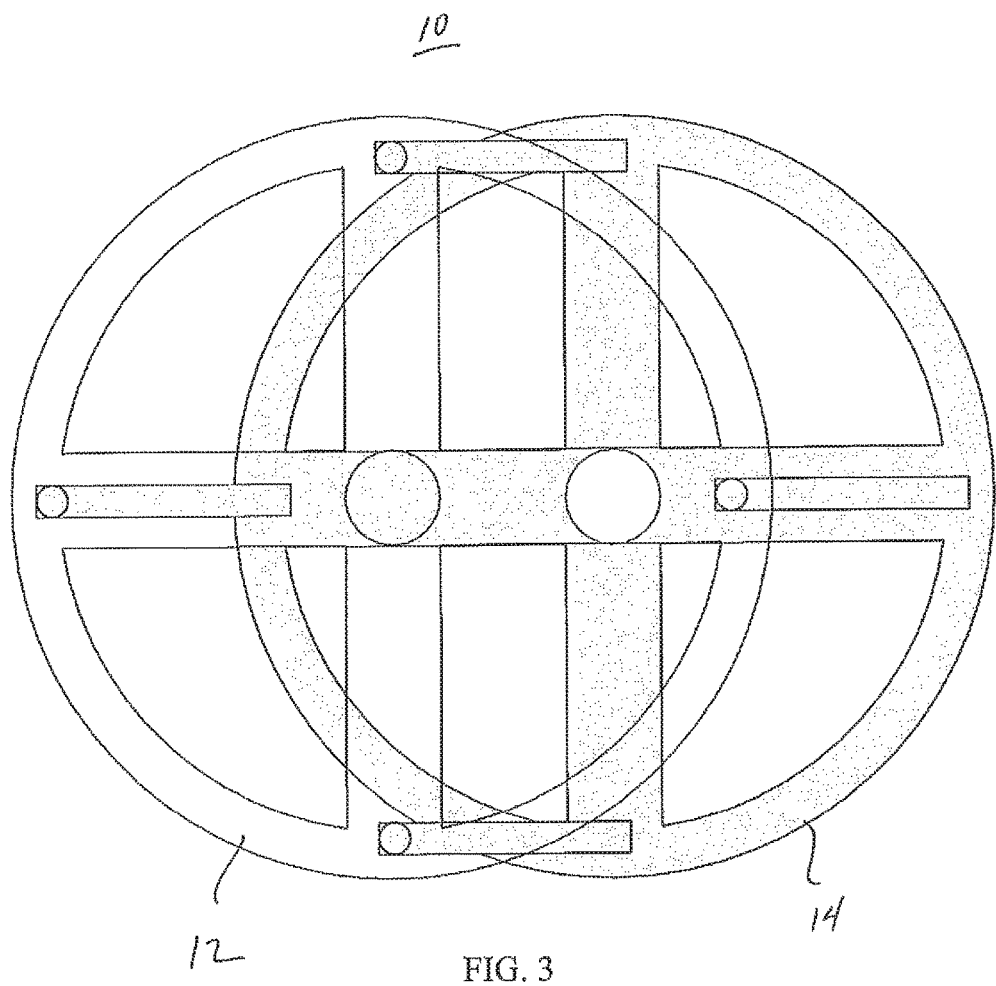
FIG. 3 is a side view of the mechanism of FIG. 1 having the orientation of FIG. 1.
Figure 4:
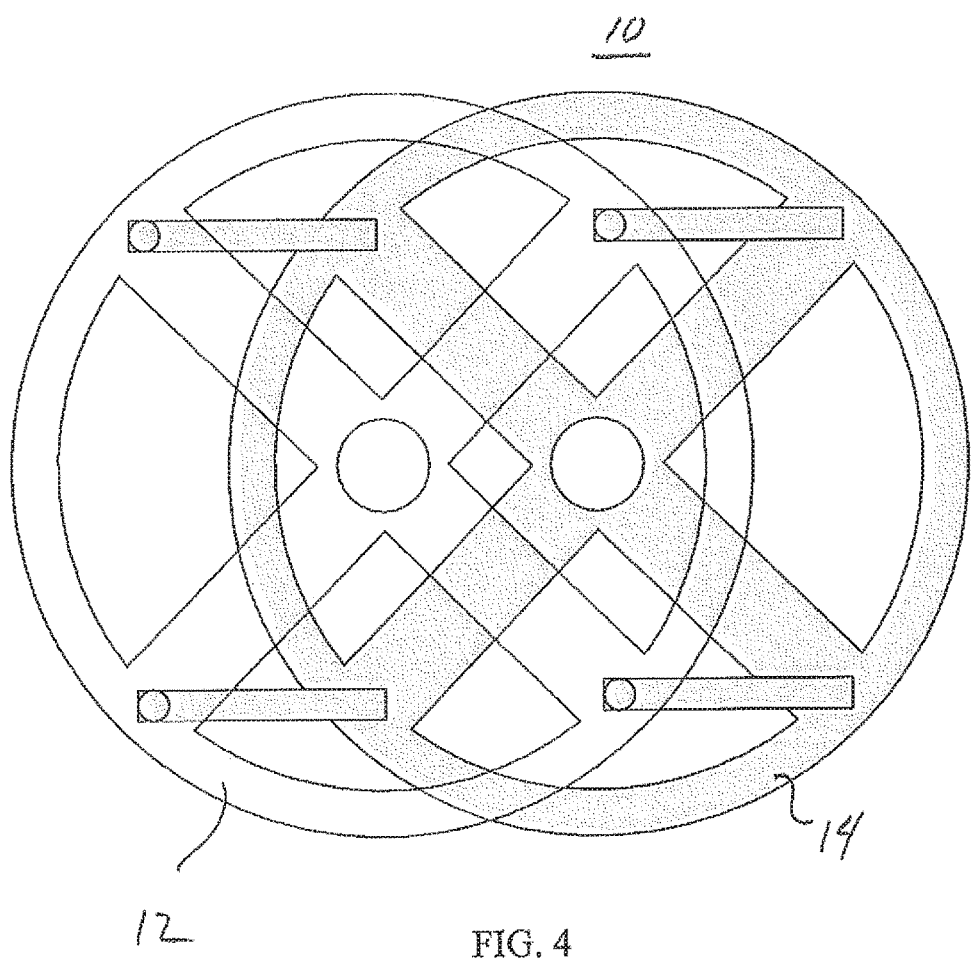
FIG. 4 is a side view of the mechanism of FIG. 1 having the orientation of FIG. 2.

As part of one phase of one type of an automated order fulfillment system, a robot delivers a pod having desired items on shelves to a location for processing according to instructions from a control system. Items typically are chosen from the pods, shelving units, or totes on the shelving units according to instructions from the control system that are communicated to a person or a robotic arm. In some circumstances, this process is referred to as picking and is performed by a picker. The picker electronically records removal of an item from a pod, for example by scanning a code on the item (such as by using a one dimensional or two dimensional bar code scanner) or reading an RFID tag, and then places the item in one of several totes. The tote may hold one or more than one item depending on the particular goal of the overall system. Typically, each tote also has identifying information, which can be scanned contemporaneously with the item scanning such that the tote is associated with the items in it. After the one or more items are placed in a particular tote, the person can push the tote rearward onto a conveyor that transports the totes for singulation or accumulation or other processing.

As explained more fully below, a parallel axis rotary conveyance and tote presentation mechanism 10 may be employed to improve the above and like systems. The present invention is not limited to employing mechanism 10 in the environment described above, nor is mechanism 10 limited to use with totes, or with the particular configuration described herein. Rather, it is intended that the present invention be given its full scope as defined in as-filed and/or granted claims.

In this regard, the rotary conveyance mechanism may be used for any purpose relating to maintaining a parallel, preferably horizontal, orientation of its carriages and presenting or transporting the carriages to a desired location. The mechanism includes a pair of spaced apart, offset wheels that are connected by carriages in a manner in which the carriages maintain their parallel, preferably horizontal, orientation merely by rotation of the wheels.

A tote presentation and management system 110 and method uses the rotary conveyance mechanism and includes a means for feeding totes to the rotary mechanism, means for picking items to place into the totes, means for positioning a tote or a desired tote to a particular location relative to the picking operation, and when the tote is ready for discharge, means for rotating the mechanism to position the tote for discharge by grasping by a person or robot or by a short conveyor segment located on the carriage. One or more conveyors may receive the discharged tote.

As shown in FIGS. 1 through 4, the mechanism 10 includes a first wheel 12 and a second wheel 14. First wheel 12 preferably is a mirror image of second wheel 14 and is offset therefrom. First wheel 12 is disc-like and defines a first rotational axis A1 at its center. A peripheral face 16 is on the inboard side of wheel 12 (that is, on the face that is nearest opposing second wheel 14).

Second wheel 14 also is disc-like and defines a second rotational axis A2 at its center. A peripheral face 18 is on the inboard side of wheel 14 (that is, on the face that is nearest opposing second wheel 12). The figures illustrate first and second wheels 12 and 14 as having spokes between a hub and the peripheral face. The present invention is not intended to be limited to any particular wheel configuration, such as the hub and spoke configuration illustrated in the figures, but rather encompasses any wheel structure that achieves the support of the carriages, as explained below.

Wheels 12 and 14 include a bearing system for supporting wheels 12 and 14 and enabling their rotation. Reference numerals 20 and 22 are used to indicate a system for supporting wheels 12 and 14, which can include any (preferably conventional) supports as will be understood by persons familiar with rotational equipment. For non-limiting example, each wheel can be fitted with its own shaft at 20,22, which shaft can be supported by bearings on each side of each wheel, or each wheel can be fitted with its own bearing at 20,22 such that each bearing supports a fixed shaft that extends through the bearings 20,22 and is supported on each end, or the shaft can be cantilevered, or any other like support mechanism may be employed.

First axis A1 is parallel second axis A2 and, preferably, axes A1 and A2 are mutually parallel so as to form a horizontal plane. Second axis A2 is offset in an offset direction O1 (FIG. 1), which is in the horizontal plane defined by lines A1 and A2 and perpendicular to each line A1 and A2. Second axis A2 is offset from first axis A1 (and in this way wheel 12 is offset from second wheel 14) by an offset dimension D1. The embodiment in the figures is illustrated in a horizontal configuration such that first rotational axis A1 and second rotational axis A2 line in a single, horizontal plane and carriages (described later) are oriented horizontally. The present invention is not limited to the horizontal orientation, as the present invention is intended to encompass any parallel orientation of the carriages, which will be understood by persons familiar with rotary conveyance in view of the present disclosure One or more carriages 30 are connected between the first and second wheels 12 and 14. The figures illustrate four carriages 30a, 30b, 30c, and 30d. The present invention encompasses any number of carriages according to the particular purposes of the rotary system, available height relative to the spacing of the carriages, and like parameters that will be understood by persons familiar with the particular use of the system 10 in view of the present disclosure.

Each carriage 30 includes a carriage body 32 that is oriented approximately horizontally. Each body 32 preferably has a working surface 34 on its upper surface. Surface 34 may be a fixed tray or shelf, a tray or shelf with a lip for retaining items, a conveyor segment, or any other surface or configuration depending on the desired use of the system. In the embodiment in which working surface 34 includes a conveyor segment, the conveyor segment may be, for non-limiting example, an unpowered conveyor (such as a ball or roller conveyor) or a powered conveyor (such as a belt or roller) conveyor, or the like without limitation. For the embodiments having powered conveyors, a slip ring (not shown in the figures), or other conventional means, may be provided to supply power to the conveyor segment. Reference numeral 34 is employed to refer to any of the structure described herein relating to the embodiments of the working surface.

Body 32, as illustrated in the figures, is flat and rectangular. A first shaft 40 extends from a corner of body 32 and a second shaft 42 extends from another, not adjacent corner of body 32. Shafts 40 and 42 are spaced apart from one another along direction O1 by the offset dimension D1. In this regard, the offset distance along direction O1 of the spacing of the centerlines of shafts 40 and 42 is the same distance D1 of the spacing of the centerlines of the first and second axes of rotation A1 and A2. In embodiments illustrated in the figures, direction O1 is also parallel to planes formed by the wheels 12 and 14.

First shaft 40 extends in a lateral direction L1 (that is, perpendicular to the offset direction O1 and parallel to the axes A1 and A2) into a first bearing 46 that is mounted on first wheel 12 at its peripheral face 16. Second shaft 14 extends in lateral direction L1 into a second bearing that is mounted on second wheel 14 and its peripheral face 18. Because of the offset relationship of the shafts and their connection to the wheels at only one pivotal coupling, which in the embodiment shown is at bearing 46 for the first shaft 40 and at bearing 48 for second shaft 42, the shafts and the connections are referred to as offset or not adjacent. Further, the axes defined as normal to the pivotal connections 46 and 48 are parallel, even though it is not required that the shafts be parallel, as outside of bearings 46 and 48, the shafts may be of any shape. Moreover, the term pivotal connection encompasses the configuration in which shafts extend from faces 16 and 18 and bearings are connected to the carriages 30.

In embodiments in which the carriages are rectangles and the shafts are at corners of the rectangles (as shown in the figures), the term "not adjacent" means that the shafts 40 and 42 are at corners that do not share a common side. The present invention is not limited to carriages that are rectangular, sides that are straight, shafts that extend from ends of the carriage body, or any other configuration. In such configurations, the term "not adjacent" refers to the offset relationship described herein.

In operation of system 10, wheels 12 and 14 rotate together or synchronously. In this regard, a drive (not shown in the figures) can rotate system 10. The present invention is not intended to be limited to any drive configuration. For non-limiting example, a stepper motor or other direct drive can be connected to a shaft of wheel 12, a belt and pulley drive or a motor and gearbox can be connected to the shaft or connected to wheel 12 at or near the periphery 16, or any other drive system can be employed to rotate wheel 12 and, as needed, to stop the rotation. Wheel 14 may be driven with wheel 12 by its own drive that is electronically synchronized with the drive of wheel 12. And/or wheel 14 may be driven with wheel 12 by mechanically linking the wheels, such as by interconnecting gears and shafts, such that torque imparted to wheel 12 is also imparted to wheel 14. And/or wheel 14 may be entirely un-driven, but can rotate synchronously with wheel 12 because of the connection between the wheels 12 and 14 by the carriages 30. In other words, the carriages can transmit torque between the wheels 12 and 14 and create or contribute to the synchronization of wheels 12 and 14. Preferably, the drive technology employed is conventional.

Further, as explained more fully below, wheels 12 and 14 are configured to stop at a controlled or predetermined position in order to present the carriage 30 to a desired position. The means for stopping the rotation of wheels 12 and 14 can be chosen according to known principles consistent with the type of drive chosen, and can include without limitation electric or mechanical breaks or stops, or any other components or systems.

Figure 5:
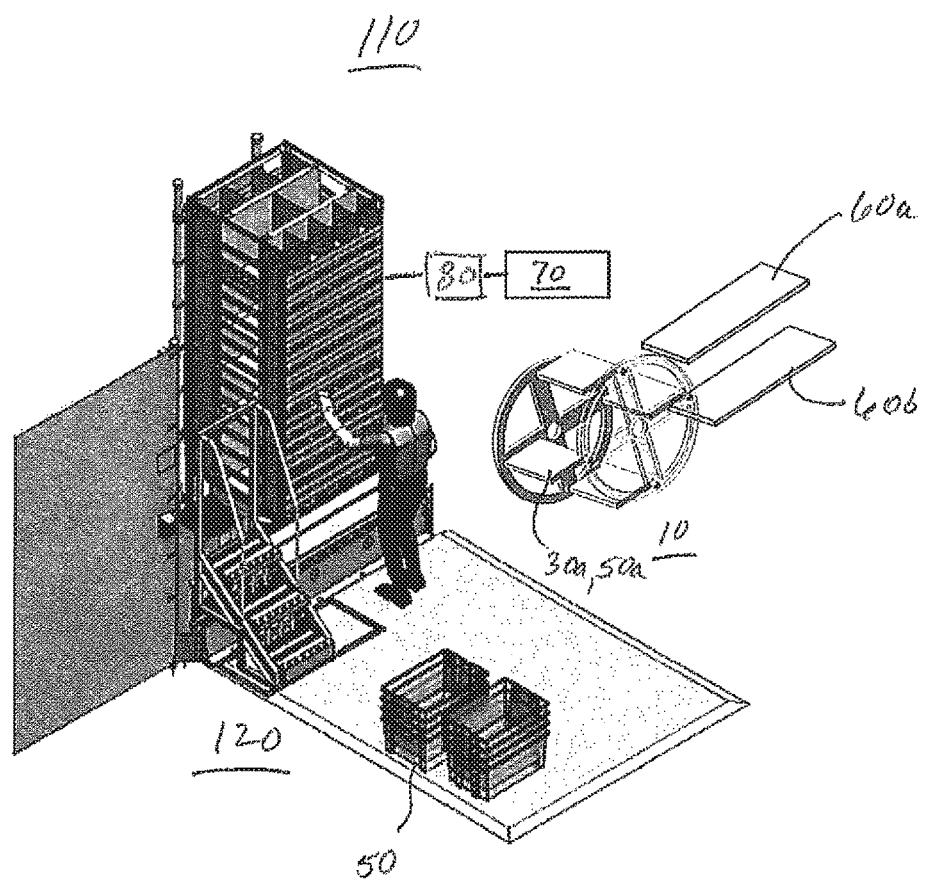
FIG. 5 is a perspective view of a system for employing the mechanism of FIG. 1 as part of a tote presentation and management system.

Referring to FIG. 5 for merely one non-limiting example of the use of rotary system 10, a tote management system 110 can include a means for transporting a desired item to a desired location 120 proximate rotary system 10, a means for picking the item upon its arrival at location 120 and placing the item into a tote, a means for feeding totes onto the carriages of rotary mechanism 10 such that they may be presented to location 120 as desired, and discharge means for transporting the totes away from rotary mechanism 10 at the desired time for further processing.

In operation, tote management system 110 may be employed such that an item to be placed into a tote 50a can first be picked or chosen. In this regard, the item to be placed into tote 50a can arrive to location 120 by any type of conveyor, by a robot moving a pod or shelf unit to the general location, or any other means. Block 70 is shown to refer to such tote delivery means. The control system, which is identified schematically by reference numeral 80 in FIG. 5, and can include a display as an interface for the person picking the times, can identify the desired tote, such as by order on the belt, highlighting the item on a shelf, or other means.

The picker will be instructed to pick the identified item from the pod or tote. For example, a person may be instructed via a screen to pick the identified item or a robotic arm may receive electronic instructions to pick the identified item. Once picked, sensors and/or scanners may be used to identify that the identified item has been removed from the pod or tote using a one or two dimensional code. In sequence with the process of moving the item to general location 120, a control system may employ rotary mechanism 10 to position a particular tote 50a into a ready position, as shown in FIG. 5. The control system may control movement of the rotary mechanism 10 based on instructions associated with the identified item. For example, when the control system sends instructions to the picker to pick the identified item, the control system may rotate the rotary mechanism to present the receiving tote that will receive the identified item. Alternatively, when the control system receives information that the identified item has been removed from the pod or tote, the control system may rotate the rotary mechanism to present the receiving tote that will receive the identified item. In this way, the control system may rotate clockwise and counterclockwise to present the tote that will receive the identified item. The receiving tote (tote 50*a*) may have identifying information, may already include other items that are associated with the desired item that has been transported and picked, such as when all the items are part of a single order, or all the items are the same and the desire is to consolidate them, or any other reason.

In this regard, the process can be referred to as "pick to target" in that a desired item is picked with a known tote 50*a* as the target, as distinguished from picking a desired item and then placing it in a tote that is then identified. In contrast, in a system in which several totes are aligned, the picker seeking to place the item in a tote either chooses the next tote in sequence or has to locate the desired tote from among the aligned totes.

Referring again to FIG. 5, at a predetermined point, such as when the tote is known to contain the desired item(s), when the tote is full (such as can be determined by weight, such as load cells located on working surface 34, or by optical sensors, or the like), or other parameter, the wheels 12,14 may rotate to position another tote 50*b* closest to location 120 and into position for placing items therein, and/or may rotate to position tote 50*a* relative to one or more discharge conveyors 60*a*, 60*b* that can transport tote 50*a* for further processing.

Tote 50*a*, after receiving one or more predetermined items, can be rotated to another position while another tote is moved to location 120 for receiving items, or another tote is moved to a discharge position. Then tote 50*a* may be moved back to location 120 for receiving additional predetermined items. Thus, tote 50*a* may remain on its carriage for several movements of wheels 12,14, as needed or convenient for receiving items.

FIG. 5 illustrates discharge conveyors 60*a*, 60 schematically and to show that conveyor 60*a* may be a different height or vertical position relative to conveyor 60*b*. For a non-limiting example, conveyor 60*a* may positioned to receive discharged totes when the rotary mechanism is stopped at 1:30 o'clock (that is, 45 degrees past vertical) and conveyor 60*b* may be positioned to receive discharged totes when the rotary mechanism is stopped at 4:30 o'clock (that is, 135 degrees past vertical).

The control system can move totes 50 into position as needed and in coordination with the desired items being transported to location 120. In this regard, the efficiency and effectiveness of the process of moving items from a pod or shelf unit into a tote is improved.

The present invention is not limited to the particular structure of the rotary mechanism 10 or the tote presentation system 110, as the structure and function described herein is provided only for example. Rather, it is intended that the present invention be given the full scope as defined in the claims.

What is claimed is:

1. A rotary conveyance mechanism for presenting totes in a horizontal orientation, the rotary conveyance mechanism comprising:
    a first circular wheel that is vertical and defines a first horizontal axis of rotation;
    a second circular wheel that is vertical and defines a second horizontal axis of rotation, the second wheel is parallel to and spaced apart from the first wheel;
    the first wheel is offset in a horizontal direction perpendicular to the first and second horizontal axes of rotation by an offset dimension; and
    plural carriages, each one of the carriages having a body that includes a working surface for supporting a tote and each one of the carriages being connected to the first wheel at a first pivotal coupling and connected to the second wheel at a second pivotal coupling, the first pivotal coupling being spaced apart from the second pivotal coupling in the offset direction approximately by the offset dimension;
    wherein rotation of the first and second wheels rotates the carriages such that the working surface of each one of the carriages remains horizontal throughout the rotation.

2. A rotary conveyance mechanism for presenting carriages in a horizontal orientation, the rotary conveyance mechanism comprising:
    a first circular wheel that is vertical and defines a first horizontal axis of rotation;
    a second circular wheel that is vertical and defines a second horizontal axis of rotation, the second wheel is parallel to and spaced apart from the first wheel;
    the second horizontal axis of rotation is parallel to and spaced apart from the first horizontal axis of rotation in an offset direction to define an offset dimension; and
    plural carriages, each one of the carriages having a body that includes a working surface and each one of the carriages being connected to the first wheel at a first pivotal coupling and connected to the second wheel at a second pivotal coupling, the first pivotal coupling being spaced apart from the second pivotal coupling in the offset direction approximately by the offset dimension;
    wherein rotation of the first and second wheels rotates the carriages such that the working surface of each one of the carriages remains mutually parallel throughout the rotation.

3. The rotary conveyance mechanism of claim 2 wherein each one of the carriages includes a first shaft extending from the carriage body and a second shaft extending from the carriage body, and wherein the first shaft is not adjacent the second shaft relative to the carriage body and the first shaft is offset from the second shaft in the offset direction by the offset dimension.

4. The rotary conveyance mechanism of claim 3 wherein the carriages remain horizontal throughout the rotation, and the first horizontal axis of rotation of the first wheel and the second horizontal axis of rotation of the second wheel form a horizontal plane.

5. The rotary conveyance mechanism of claim 4 wherein each one of the first pivotal couplings is a bearing affixed to the first wheel and each one of the second pivotal couplings is another bearing affixed to the second wheel.

6. The rotary conveyance mechanism of claim 4 wherein the working surface is a flat surface adapted for receiving and holding a tote.

7. The rotary conveyance mechanism of claim 6 wherein the working surface includes a conveyor.

8. The rotary conveyance mechanism of claim 7 wherein the conveyor is powered and capable of discharging a tote in response to a control signal.

9. A tote presentation and management system comprising:
   the rotary conveyance mechanism of claim 4; and
   a control system configured to position the carriage to present a tote to a location for placing items into the tote.

10. The system of claim 9 further comprising:
    at least one discharge conveyor that is configured to receive totes from the carriages after items are placed into the totes; and
    a tote feed means configured to feed totes on to the carriages, each one of the totes having unique identifying information.

11. The system of claim 10 wherein the control system sends a signal to actuate the rotary conveyance mechanism in response to item information scanned into the control system, thereby matching a desired tote to the item.

12. The system of claim 10 wherein the tote feed mechanism includes at least one of a robot, a conveyor, and a person to import totes and place the totes onto the carriages.

13. The system of claim 10 wherein the at least one discharge conveyor is positioned opposite the location for placing the item into the tote.

14. The system of claim 13 wherein the at least one discharge conveyor is one of two discharge conveyors and three discharge conveyors, each one of the discharge conveyors is spaced vertically apart and corresponding to a rotational location of the carriages, whereby the control system positions a desired tote relative to a desired one of the discharge conveyors for discharge of the desired tote onto the desired discharge conveyor.

15. The system of claim 14 wherein the working surface of each one of the carriages includes a conveyor segment configured to discharge the desired tote from the carriage onto the desired discharge conveyor in response to a signal from the control system.

16. A method for presenting and managing totes such that the items are picked-to-target relative to the totes, the method comprising:

(i) feeding a first tote onto the rotary conveyance mechanism of claim 4, the first tote having unique identifying information;
(ii) rotating the rotary conveyance mechanism to present the first tote to a location for placing one or more items into the first tote;
(iii) after the rotating step (ii), placing one or more predetermined first items into the first tote;
(iv) after the placing step (iii), rotating the rotary conveyance mechanism to a desired location such that the first tote corresponds to a desired discharge conveyor;
(v) discharging the first tote onto the desired discharge conveyor; and
(vi) feeding a second tote onto the rotary conveyance system during the placing step (iii) and/or the discharging step (v).

17. The method of claim 16 further comprising the step of, after the placing step (iii) and before the discharging step (v):
    rotating the rotary conveyance mechanism such that the first tote having the one or more predetermined first items is moved away from the location for placing one or more items into the first tote;
    then rotating the rotary conveyance mechanism to move the first tote to the location for placing one or more items into the first tote; and
    then placing one or more predetermined second items into the first tote.

18. The method of claim 16 wherein the rotating step (ii) holds the first tote to the location for placing one or more items in the first tote until a signal indicating that the placing step (iii) is complete.

19. The method of claim 16 further comprising the step of reading information identifying the item and associating the item information with the tote information.

20. The system of claim 16 wherein the rotating step (iv) includes rotating the rotary conveyance mechanism to any one of multiple discharge conveyors.

\* \* \* \* \*